Patented Apr. 11, 1950

2,503,841

UNITED STATES PATENT OFFICE 2,503,841

PRESERVATION OF TIMBER

Gordon James Pritchard, Liverpool, England, assignor to Ward Blenkinsop & Company Limited, London, England, a company of Great Britain No Drawing. Application October 23, 1946, Serial No. 705,255. In Great Britain October 30, 1945

9 Claims. (Cl. 117—151)

This invention is concerned with improvements in and relating to the preservation of timber.

British specification No. 584,196 describes the preparation of a series of substances which may conveniently be regarded as salts of di-substituted methane compounds, referred to therein as "D. S. M. compounds."

These D. S. M. compounds may be defined as of the general formula, $R_1.CH_2.R_2$, in which $R_1$ may be a phenol sulphonic acid, an alkyl phenol sulphonic acid, a carboxyl phenol sulphonic acid, a diphenyl or alkyl diphenyl mono- or disulphonic acid, a benzene sulphonic acid, a sulphobenzoic acid, a naphthalene or alkylnaphthalene mono- or disulphonic acid, a naphthol or alkyl naphthol sulphonic acid, or a nuclear substituted halogen derivative of any of the above substances, and $R_2$ may either be identical with $R_1$ or may be any other member of the group of substances mentioned for $R_1$. The substances listed in the above group are hereinafter referred to as "R sulphonic acids."

The D. S. M. compounds are conveniently prepared by condensing 2 molecules of one or one molecule each of two different R sulphonic acids with formaldehyde.

The above mentioned salts are, according to the said specification prepared by combining D. S. M. compounds with organometallic compounds of the general formula $R_3HgA$ where $R_3$ is an alkyl, aryl, aralkyl or heterocyclic radicle, which may or may not be substituted with neutral, acidic or basic substituents, $Hg$, is a mercury atom, preferably mercury or arsenic, and A is an acidic radicle such as halide, nitrate, acetate or hydroxide or oxide or any other suitable group either organic or inorganic and of such a nature that the compound will react with the D. S. M. compound, and irrespective of whether the said group is or is not split off in the process of the formation of the salt.

Substances falling within the definition given in the immediately preceding paragraph are herein referred to as "salt forming components."

It has now been found that the salts of D. S. M. compounds as described in the above-mentioned British specification have valuable properties for rot-proofing and preserving timber and other lignified or cellulosic materials or fabrics, (hereinafter collectively referred to as "timber") and that neither the isolation nor indeed the preformation of the said salts are essential for the production of solutions useful for such purposes, but that timber can be successfully rot-proofed or preserved by treating it with a solution of components from which the said salts could be formed.

Accordingly the present invention provides a process for the preservation of timber, in which the latter is treated with a solution preferably in water, of one or more R sulphonic acids, one or more salt forming components and a formaldehyde-yielding substance such as formaldehyde or a compound evolving formaldehyde such as a polymer.

According to a modification of the invention the timber may be treated with a solution, preferably in water of one or more preformed D. S. M. compounds and one or more salt forming components.

According to a still further modification the timber may be treated with a solution, preferably in water, of a formaldehyde yielding substance such as formaldehyde or of a compound evolving formaldehyde, such as a polymer, and one or more preformed salts of one or more R sulphonic acids and one or more salt forming components.

The treatment of the timber may be effected in any convenient manner as for example by impregnation or imbibition, and either with or without the application of heat or pressure.

In some cases the stoichiometrically equivalent quantities of the several components may be be used, whilst in other cases, such for example as where it may be desired to improve the solubility or to vary the pH value, or otherwise promote impregnation or imbibition an excess of one or other component over such stoichiometrically equivalent quantity may be added. If desired a small quantity of a suitable wetting agent or textile assistant may also be added.

Although the invention is not limited by any theoretical explanation, it may be said that it appears probable that by treating timber according to the herein described process preservative materials are formed and fixed in the fibre either during any application of heat and/or pressure or later during the passage of time. It further seems probable that the constitution of these preservative materials is the same as or similar to that of the preformed materials described in the above mentioned specification prepared from the same components.

The following examples of methods in which the invention may be carried out are given only by way of illustrations:

Example 1

5.89 parts by weight of phenyl mercury hydroxide were dissolved in water to give a 1% solution, and 4.16 parts by weight of naphthalene-2-sulphonic acid were added. This was followed by 7.5 parts by weight of 40% formalin. The whole was then diluted with water to give a total volume equivalent to 20,000 parts by weight, and the timber for preservation was immersed in this solution for a minimum of 24 hours.

It will of course be understood that any suitable method of impregnation may be used, and that the time of impregnation will depend on various circumstances, such as inter alia the nature and dimensions of the timber and the desired depth of impregnation.

Example 2

1 part by weight of the phenyl mercury complex of bis - (naphthalene-2-sulfonic acid) methane was dissolved in 78 parts by weight of a 33% solution of bis-(naphthalene-2-sulphonic acid)-methane by warming gently. The solution was neutralised to pH7 by addition of ammonia in 25% aqueous solution, and the whole then diluted by addition of 10,000 parts by weight of water. The solution was then ready for use.

Example 3

1 part by weight of the phenyl mercury complex of bis-(naphthalene - 2 - sulphonic acid) methane was dissolved in 2.6 parts by weight of bis-(naphthalene-2-sulphonic acid) methane. 4 parts by weight of sodium fluoride was then added to the solution, and the whole diluted to 10,000 parts and the pH of the solution adjusted to 4–4.5.

Sodium dichromate and a dinitrophenol may with advantage be incorporated in this solution.

Example 4

The phenyl mercury complex obtained by the reaction of phenyl mercury acetate with bis-(naphthalene-2-sulphonic acid)-methane was dissolved to give a 0.1% solution in bis-(naphthalene-2-sulphonic acid) methane; to 100 parts of this solution 4 parts by weight of potassium bichromate was added followed by 4 parts by weight of sodium fluoride. The solution was then ready for use in wood impregnation.

I claim:

1. Process for the preservation of timber which comprises forming in contact with the timber a compound of a sulphonic acid of the group consisting of a phenol sulphonic acid, an alkyl phenol sulphonic acid, a carboxyl phenol sulphonic acid, benzene sulphonic acid, diphenyl mono- and di-sulphonic acids, naphthalene mono- and di-sulphonic acids, sulphobenzoic acid, a hydroxynaphthalene sulphonic acid, an alkyl substituted naphthalene sulphonic acid, an alkyl substituted hydroxynaphthalene sulphonic acid and nuclear substituted halogen derivatives thereof, a salt forming component $R_3HgA$ where $R_3$ is a radical selected from the group consisting of unsubstituted and substituted alkyl, aryl, aralkyl, and heterocyclic radicals, Hg is a mercury atom and A is an acid radical, and formaldehyde.

2. Process for the preservation of timber which comprises forming in contact with the timber a salt of a di-sulphonic acid substituted methane of the general formula $R_1—CH_2—R_2$ where $R_1$ stands for a member of the group consisting of a phenol sulphonic acid, an alkyl phenol sulphonic acid, a carboxyl phenol sulphonic acid, benzene sulphonic acid, diphenyl mono- and di-sulphonic acids, naphthalene mono- and di-sulphonic acids, sulphobenzoic acid, a hydroxynaphthalene sulphonic acid, an alkyl substituted naphthalene sulphonic acid, an alkyl substituted hydroxy-naphthalene sulphonic acid and nuclear substituted halogen derivatives thereof and $R_2$ stands for a member of the above defined group, a ring carbon atom of each of $R_1$ and $R_2$ being attached directly to the methylene radical, and a salt forming component $R_3HgA$ where $R_3$ is a radical selected from the group consisting of unsubstituted and substituted alkyl, aryl, aralkyl and heterocyclic radicals, Hg is a mercury atom and A is an acid radical, by reaction of the components of said salt.

3. A process as defined in claim 2 in which a formaldehyde yielding substance, a sulphonic acid selected from the group consisting of a phenol sulphonic acid, an alkyl phenol sulphonic acid, a carboxyl phenol sulphonic acid, benzene sulphonic acid, diphenyl mono- and di-sulphonic acids, naphthalene mono- and di-sulphonic acids, sulphobenzoic acid, a hydroxynaphthalene sulphonic acid, an alkyl substituted naphthalene sulphonic acid, an alkyl substituted hydroxynaphthalene sulphonic acid and nuclear substituted halogen derivatives thereof and said salt-forming component are reacted together in contact with the timber.

4. A process as defined in claim 2 in which said disulphonic acid substituted methane is reacted with said salt forming component in contact with the timber.

5. A process as defined in claim 2 in which a formaldehyde yielding substance is reacted in contact with the timber with a salt formed from said salt-forming component and a sulphonic acid selected from the group consisting of a phenol sulphonic acid, an alkyl phenol sulphonic acid, a carboxyl phenol sulphonic acid, benzene sulphonic acid, di-phenyl mono- and di-sulphonic acids, naphthalene mono- and di-sulphonic acids, sulphobenzoic acid, a hydroxynaphthalene sulphonic acid, an alkyl substituted naphthalene sulphonic acid, an alkyl substituted hydroxynaphthalene sulphonic acid and nuclear substituted halogen derivatives thereof.

6. A process as defined in claim 2 in which an aqueous mixture of an R sulphonic acid selected from the group consisting of a phenol sulphonic acid, an alkyl phenol sulphonic acid, a carboxyl phenol sulphonic acid, benzene sulphonic acid, diphenyl mono- and di-sulphonic acids naphthalene mono- and di-sulphonic acids, sulphobenzoic acid, a hydroxynaphthalene sulphonic acid, an alkyl substituted naphthalene sulphonic acid, an alkyl substituted hydroxynaphthalene sulphonic acid and nuclear substituted halogen derivatives thereof, said salt-forming component and a formaldehyde yielding substance is applied to the timber.

7. A process as defined in claim 2 in which an aqueous mixture of said di-sulphonic acid substituted methane and said salt forming component is applied to the timber.

8. A process as defined in claim 2 in which an aqueous mixture of a formaldehyde yielding substance and a salt formed from said salt-forming component and an R sulphonic acid selected from the group consisting of a phenol sulphonic acid, an alkyl phenol sulphonic acid, a carboxyl phenol sulphonic acid, benzene sulphonic acid, diphenyl mono- and di-sulphonic acids, naphthalene mono- and di-sulphonic acids, sulphobenzoic acid, a hydroxynaphthalene sulphonic acid, an alkyl substituted naphthalene sulphonic acid, an alkyl substituted hydroxynaphthalene sulphonic acid and nuclear substituted halogen derivatives thereof, is applied to the timber.

9. A process as defined in claim 2 in which the reaction mixture in which said salt of said disulphonic acid substituted methane is formed contains an excess of the acid component.

GORDON JAMES PRITCHARD.

REFERENCES CITED

The following references are of record in the file of this patent:

UNITED STATES PATENTS

| Number | Name | Date |
| --- | --- | --- |
| 1,191,480 | Schmidt | July 18, 1916 |
| 1,274,171 | Landau | July 30, 1918 |

FOREIGN PATENTS

| Number | Country | Date |
| --- | --- | --- |
| 22,990 | Great Britain | Oct. 25, 1904 |